No. 696,042. Patented Mar. 25, 1902.
C. HIGHERS.
CHURN.
(Application filed July 6, 1901.)
(No Model.)
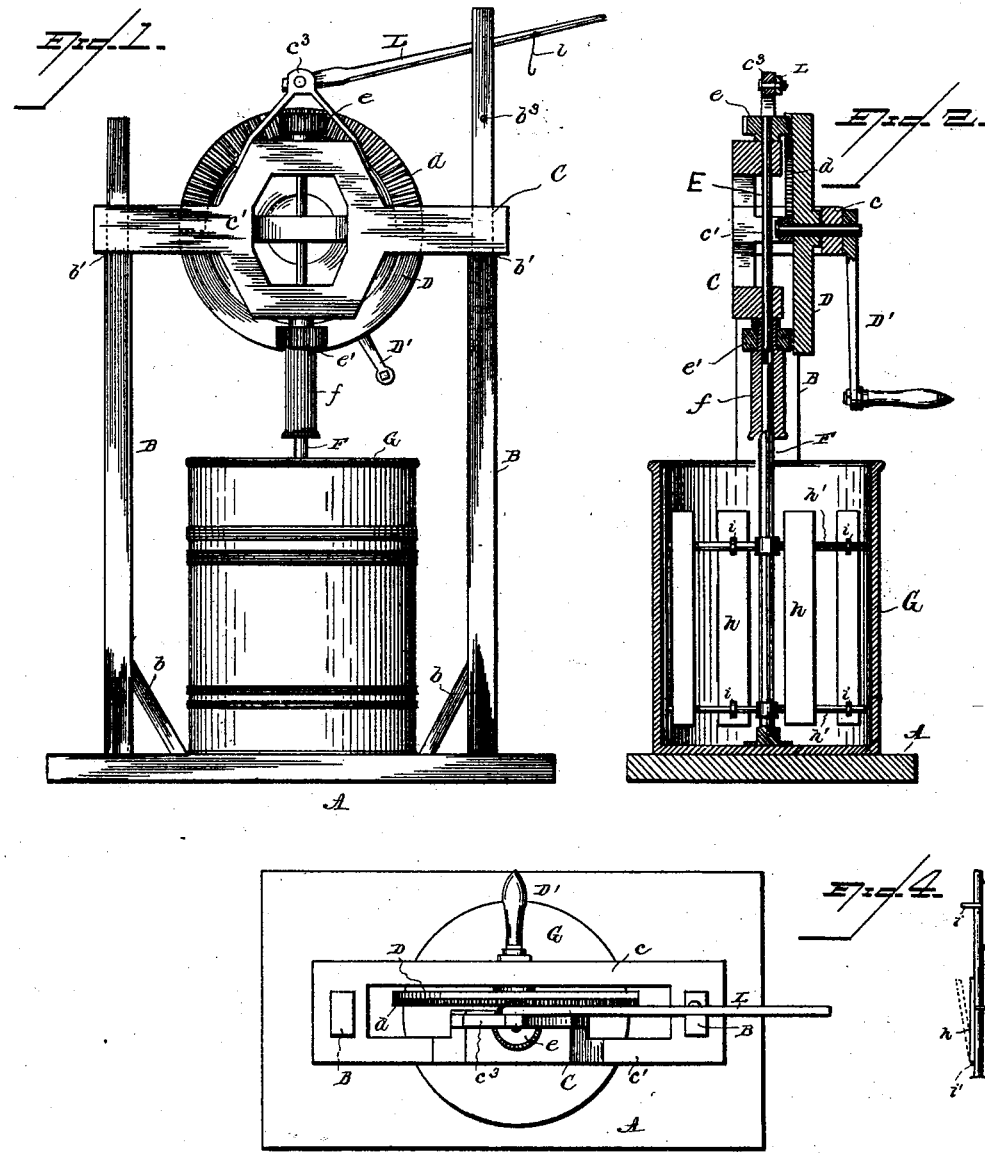

United States Patent Office.

CHARLIE HIGHERS, OF VICKSBURG, KENTUCKY, ASSIGNOR OF ONE-HALF TO GEORGE Q. JARRETT, OF VICKSBURG, KENTUCKY.

CHURN.

SPECIFICATION forming part of Letters Patent No. 696,042, dated March 25, 1902.

Application filed July 6, 1901. Serial No. 67,318. (No model.)

*To all whom it may concern:*

Be it known that I, CHARLIE HIGHERS, a citizen of the United States, and a resident of Vicksburg, in the county of Livingston and State of Kentucky, have invented certain new and useful Improvements in Churns, of which the following is a specification.

The object of this invention is to provide a churn with peculiar operating mechanism by which a rotary vibratory motion is imparted to the dashers, producing a thorough and effective agitation and aeration of the milk or cream, and consequently a rapid formation of the butter particles.

A further object of the invention is to provide a supporting-frame for the operating mechanism which will permit of the said operating mechanism being readily elevated out of engagement with the dasher-rod to give free access to the barrel, and thereby facilitate the operation of removing the butter therefrom.

The following specification enters into a detail description of my invention, reference being had to the accompanying drawings and to letters of reference thereon, and what I claim in the peculiar construction and arrangement of parts constituting the improved churn is more specifically pointed out in the appended claims.

In the accompanying drawings, which form a part of this specification, and in which like letters of reference indicate like parts in the several views, Figure 1 is a front elevation of a churn constructed in accordance with my invention. Fig. 2 is a vertical transverse sectional view through the center of the movable frame and parts carried thereby. Fig. 3 is a plan view. Fig. 4 is a detail view of the dasher.

Referring to the drawings, A designates the base, upon which the barrel and supporting-frame of the operating mechanism are mounted. At each end of the base is secured a vertical standard or upright B, held rigid by means of an inclined brace $b$, and upon the upper ends of these standards is mounted a horizontal frame C, which carries the operating gear-wheels, hereinafter particularly described. The frame C has a vertical movement upon the standards and in its lowermost position rests upon shoulders $b'$, formed by reducing the upper ends of the standards, the said reduced ends extending through openings therefor in the frame. This frame is preferably made up of two cross-pieces $c$ and $c'$, the cross-piece $c$ forming the bearing for the main driving gear-wheel D, while the cross-piece $c'$ forms the bearings for the shaft E, which turns the dasher-rod, the said shaft carrying pinions $e$ and $e'$, which are turned by the driving gear-wheel D in the manner hereinafter described. To provide a substantial bearing for the shaft, the cross-piece $c'$ is widened centrally, as shown, and formed with upper and lower bearings.

The large gear-wheel D is provided with a series of teeth $d$, extending half-way around the same to form a mutilated or partial gear-wheel, which when continuously rotated will mesh with the pinions $e$ and $e'$ alternately and impart to the shaft E a vibratory rotary motion.

To the lower end of the shaft E is secured a sleeve $f$, having a square opening in its lower end, into which fits the upper squared end of the dasher-rod F, the latter being stepped at the center of the barrel G and carries the dashers, which serve to agitate the milk or cream. The dashers consist of vertical blades $h$, hinged at one edge to the opposite sides of the arms $h'$ by eyes $i'$, so as to have a swinging motion or lateral play, (see Fig. 4,) the said movement being limited by staples $i$. This yielding motion of the blades relieves the mechanism of a sudden jar when the motion of the dasher is reversed. This dasher, therefore, is particularly adapted to this style of gearing.

It will be here noted that as the gear-wheel D is turned by means of the crank-handle D' it will first mesh with one of the pinions and turn the dasher-rod in one direction and then it will mesh with the other pinion and reverse the direction of rotation, thereby giving to the dasher-rod a rotary vibratory motion, and that as this motion is imparted to the dashers it will rotate them back and forth and produce currents that will not only insure a thorough agitation of the milk, but also effect an aeration that will assist in the rapid formation of the butter particles.

Pivotally connected to the upper end of one of the standards B is a lever L, connected at its inner end to a bail $c^3$, attached to the movable supporting-frame C, and by means of this lever the frame C may be elevated when it is desired to remove the dashers. The lever is provided with a hook $l$, which is placed in engagement with the pin $b^3$ to hold the frame in an elevated position.

From the foregoing description, in connection with the accompanying drawings, the construction and operation of my improved churn will be readily understood, and it will be noted that I provide an apparatus of this character which is simple in construction and effective in use.

Having thus described my invention, I claim—

1. In a churn, the combination, of the uprights B B having reduced upper ends, shoulders $b'$ formed at the lower end of said reduced portions, a frame C slidable vertically upon the reduced ends of the uprights, a vertical shaft mounted in the movable frame, a pinion attached to the upper end of the shaft and adapted to bear upon the upper edge of the frame, a pinion on the lower end of the shaft adapted to bear against the lower edge of the frame, a sleeve $f$ secured to the lower pinion and provided with a squared opening in its lower end, a mutilated gear D adapted to mesh with the pinions alternately and a dasher-rod stepped in the churn and having a squared upper end adapted to fit in the aforesaid sleeve; together with a lever fulcrumed to the upper end of one of the uprights and connected to the movable frame, substantially as shown and for the purpose set forth.

2. In a churn, the combination with the dasher-rod and means for imparting a rotary vibratory motion thereto, of cross-bars $h'$ $h'$ attached to the dasher-rod, vertical dashers or boards $h$ hinged at one edge to said cross-bars and adapted to swing outwardly, and loops or bails attached to the boards and extending around the cross-bars to limit the swinging movement of said boards, as shown and for the purpose set forth.

In testimony whereof I affix my signature in the presence of two witnesses.

CHARLIE HIGHERS.

Witnesses:
J. W. DURHAM,
L. J. DURHAM.